United States Patent [19]

Harrison et al.

[11] Patent Number: 5,051,816
[45] Date of Patent: Sep. 24, 1991

[54] PIXEL GENERATOR TEST SET

[75] Inventors: Gordon L. Harrison, Alexander; Thomas P. Parker, Little Rock, both of Ark.

[73] Assignee: AT&T Bell Laboratories, Murray Hill, N.J.

[21] Appl. No.: 605,602

[22] Filed: Oct. 29, 1990

[51] Int. Cl.⁵ .................. H04N 17/02; H04N 17/04
[52] U.S. Cl. ................... 358/10; 328/187; 328/188; 358/139
[58] Field of Search ............ 358/139, 10; 328/187, 328/188

[56] References Cited

U.S. PATENT DOCUMENTS

| | | | |
|---|---|---|---|
| 3,400,728 | 8/1983 | Long | 358/107 |
| 4,195,293 | 3/1980 | Margolin | 328/187 |
| 4,415,880 | 11/1983 | Scott | 382/27 |
| 4,435,079 | 3/1984 | Hennick | 356/123 |
| 4,454,507 | 6/1984 | Srinivasan et al. | 340/744 |
| 4,523,231 | 6/1985 | Therrien | 358/139 |
| 4,772,948 | 9/1988 | Irvin | 358/139 |
| 4,780,755 | 10/1988 | Knierim | 358/10 |
| 4,894,718 | 1/1990 | Hung | 358/139 |
| 4,916,640 | 4/1990 | Gasperi et al. | 364/521 |

Primary Examiner—Howard W. Britton
Attorney, Agent, or Firm—D. A. Marshall

[57] ABSTRACT

Apparatus and method for testing video controller devices used with a monitor terminal to generate display configurations on the terminal monitor. The disclosed apparatus and method is embodied in test apparatus arranged to prerecord a count of pixel transitions in a test pattern display intended for use in testing video controller devices. Data representing the test pattern display is applied to video controller devices to generate control signals normally enabling the video controller devices to control a terminal monitor to display the test pattern. A count of the pixel transitions generated by a tested video controller device in response to the applied data is compared with the prerecorded count of pixel transitions to determine performance of the video controller device.

17 Claims, 4 Drawing Sheets

| VCD TYPE | | | | | PASS / FAIL | |
|---|---|---|---|---|---|---|
| HOR | GUN | | COUNT DATA | PREDEFINED DATA | MATCH | |
| | M | C | | | YES | NO |
| 450 | √ | | 99 | 99 | √ | |
| | | | | | | |
| 450 | | √ | R33 | R33 | √ | |
| 450 | | √ | G33 | G33 | √ | |
| 450 | | √ | B30 | B33 | | √ |
| | | | | | | |

PIXEL GENERATOR TEST SET

TECHNICAL FIELD

The invention relates to apparatus and method for determining the performance of video controller devices used with terminal monitors.

BACKGROUND AND PROBLEM

Terminal monitors used with mainframe and personal computers and in various types of data services display various configurations of information generated by the computers and data services. Typically, such monitors are cathode-ray tubes, conventionally known as CRTs, wherein a slender beam of electrons are generated and projected on a fluorescent screen to produce a luminous spot representing information. In one configuration, a CRT display can be thought of as a page consisting of 24 rows of characters wherein each row is 80 characters in lenght. Each character is formed from an array of "dots" or "pixels" which may be configured to form numbers, letters and special symbols.

Pixels are formed on the CRT screen by turning an electron beam on and off such that a visible pixel appears on the screen when the electron beam is turned on. The electron beam is controlled by a video display device which responds to input data representing a display by controlling the CRT to move the beam horizontally and vertically across the screen and to turn the electron beam on and off thereby enabling the CRT screen to portray pixels making up the display.

In the manufacture of video controller devices, each device is tested by applying digital data defining a specific test pattern to the video controller device. The video controller device responds to the applied data by enabling a terminal CRT screen to portray the output generated by the tested video controller device. Human observation is used to compare the display generated by the tested video controller device with the specific test pattern. A problem arises in that advanced designs of video controller devices portray displays in high resolution CRTs that make human observation difficult to determine errors that may occur between a pattern generated by a defective video controller device and the specific test pattern.

Character recognition apparatus has been devised for use in identifying characters represented by pixel arrays. Such apparatus identifies a character by forming a window around the pixel array and roughly identifies a character encoded within the array by counting pixels inwardly from the top and bottom and from each side of the array until a transition is reached from off to on. The pixel count information is combined and weighted in order to determine that the array may be one of a particular set of characters. A problem arises in that this use of pixel counting apparatus only represents the outer edges of a display and must be combined and weighted to identify a character. Such apparatus does not identify details of the center of a test pattern thereby failing to detect errors that may be present in a tested video display device. Such apparatus is not concerned with video controller devices used to portray displays on color CRTs and would not distinguish between color pixels used for multi-color displays.

SOLUTION

The foregoing problems are solved by apparatus and a method for testing video controller devices by comparing a count of pixel transitions in a test pattern array with a count of pixel transitions generated by a video controller device in response to test pattern data applied to or stored within the video controller device. The apparatus and method prerecords a predetermined count of pixel transitions in a pixel array of a test pattern display intended for use in testing video controller devices. Digital data representing the test pattern display or a start signal is applied to an input of a video controller device and a count of pixel transitions generated at the output of the video controller device in response to the applied data is compared with the prerecorded pixel transition count to determine overall performance of the tested video controller device. A performance failure of the tested video controller device occurs upon a failure to match pixel transition counts generated by the tested video display device with the prerecorded test pattern pixel transition count.

DETAILED DESCRIPTION

Figure 1:
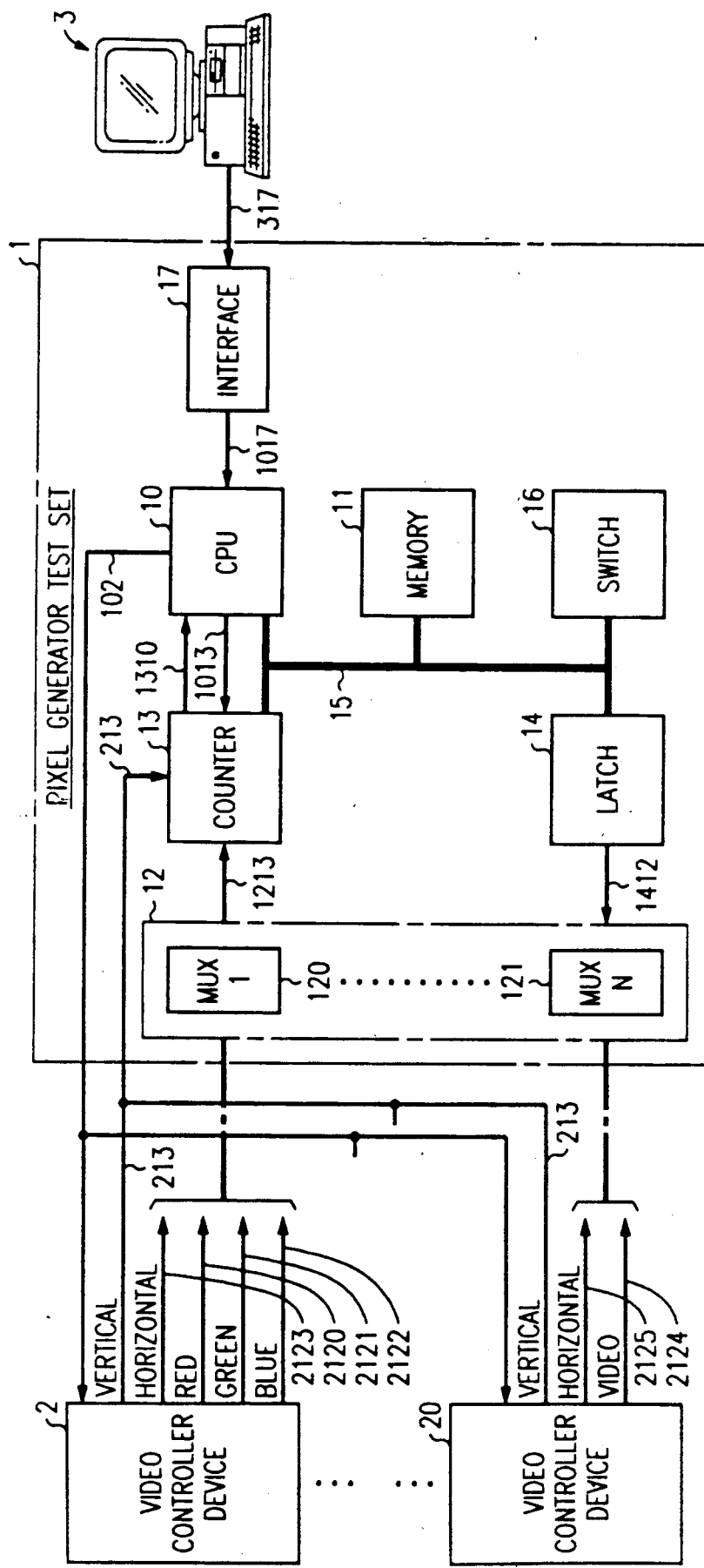
FIG. 1 is a block diagram of apparatus in accordance with the principles of the invention for testing video controller devices used with a monitor terminal to generate display configurations on the monitor terminal CRT screen.

In an exemplary embodiment of the invention, apparatus 1, FIG. 1, is used to test video controller devices 2, 20 to determine the performance of each tested video controller devices 2, 20 against standard reference video controller devices. Video controller devices 2, 20 may be a circuit board which is intended to be used with a computer or terminal, such as computer terminal 3, to control a CRT monitor associated with the computer or terminal to display a pixel display configuration. A typical CRT monitor may be a cathode-ray tube wherein slender beams of electrons are generated and projected on a fluorescent screen to produce a luminous dot representing information. In one configuration, although not limited thereto, a CRT display can be thought of as a page consisting of 24 rows of characters wherein each row is 80 characters in length. Each character is formed from an array of "dots" or "pixels" which may be configured to form numbers, letters, and special symbols.

Pixels are formed on the CRT screen by turning electron beams on and off such that a visible pixel appears on the screen when the electron beam is turned on. In general, vertical and horizontal signals are used to control electron guns of the CRT monitor to sweep horizontally across and vertically down the CRT screen. The electron beams are further controlled by video display devices 2,20 which respond to input data representing a display by turning the electron beams on and off by a control signal, hereinafter called a video signal, thereby enabling the CRT screen to portray pixels making up the display. The electron beams are turned off to represent the absence of display data and undergo a transition from off to on such that the turned on electron beam illuminates a pixel on the CRT screen to display dot information comprising a part of the visible display. The electron beams are turned off to undergo another transition to darken pixels at the end of the displayed dot information.

Video controller devices 2, 20 may receive data from other circuitry of the computer or terminal or may have a programmed read only memory (ROM) that contains data which controls video controller devices 2, 20 to generate vertical and horizontal sync signals and video signals which control operation of the CRT monitor to display information represented by the input or ROM stored data. In a monochrome CRT monitor, there may be a single gun which is controlled by the vertical and horizontal sync signals and a video signal to display data on the CRT monitor. A color monitor may have red, green, and blue guns which are controlled by the vertical and horizontal sync signals and red, green, and blue video signals to generate a color display configuration on a color monitor CRT screen.

Apparatus 1 is intended for use during the manufacture of video controller devices 2, 20 to test completed video controller devices 2, 20 with respect to standard reference video controller devices. Central processor unit 10 prerecords in memory 11 counts of pixel transitions that would be generated by standard reference video controller devices to produce test pattern displays that are intended for use in testing manufactured video controller devices 2, 20. Apparatus 1 applies data representing a prerecorded test pattern display to video controller devices 2, 20, or a reset signal, via leads 102 and compares a count of pixel transitions generated by tested video controller devices 2, 20 in response to the applied test pattern data with the prerecorded test pattern pixel transition count to determine the performance of tested video controller devices 2, 20. Apparatus 1 identifies a performance failure of tested video controller devices 2, 20 upon a failure to match the generated pixel transition count when compared with the prerecorded test pattern pixel transition count for a gun output of tested video controller devices 2, 20

Central processor unit 10, FIG. 1, may be any one of a number of different types of computers well-known in the art and need not be described in detail for an understanding of the invention and in general is connected by address, data and control leads to a bus 15. Bus 15 couples central processor unit 10 with memory unit 11, switch 16, latch 14, and counter 13. Central processor unit 10 is further coupled with interface unit 17 which interconnects apparatus 1 with data link 317 extending to computer terminal 3 so that data may be exchanged between central processor unit 10 and computer terminal 3. Computer terminal 3 may be any of a number of well-known computer terminals or personal computers and need not be described in detail for an understanding of the invention.

Apparatus 1 also has multiplex 12 which has a number of multiplex units 120, 121 which may be coupled with vertical and horizontal sync leads 213, 2125 and video signal signal lead 2124 outputs of monochrome video controller device 20 and vertical and horizontal sync leads 213, 2123 and red, green, and blue video output leads 2120, 2121, 2122 of color video controller device 2. In operation, central processing unit 10 simultaneously tests a number of video controller devices 2, 20 by applying data to leads 102 that enables video controller devices 2, 20 to generate output signals representing test pattern displays intended for use in testing manufactured video controller devices 2, 20.

Central processor unit 10 selects one of the video controller devices 2, 20 by sending a digital signal over bus 15 to control latch 14 to set one of the multiplex units 120, 121, for example multiplex unit 120, via control lead 1412 to select a first video controller device, such as color video controller device 2. Selected multiplex unit 120 operates to connect vertical and horizontal sync leads 213, 2123 and red, green, and blue video leads 2120, 2121, 2122 of selected video controller device 2 with counter 13. Counter 13 is enabled by central processor unit 10 applying a start signal to start lead 1013 and a vertical sync signal appearing on vertical sync lead 213 to count and record in memory 11 a count of pixel transitions generated by each video signal output on red, green, and blue video output leads 2120, 2121, 2122 and the number of horizontal lines indicated by horizontal sync lead 2123 of selected color video controller device 2.

Central processor unit 10 compares the pixel transition counts generated by selected video controller device 2 and recorded in memory unit 11 with the prerecorded test pattern pixel transition counts for each video signal output of selected video controller device that appeared on red, green, and blue video output leads 2120, 2121, 2122 and determines the performance of video controller device 2 on a basis of the comparison. Central processor unit 10 identifies a performance failure of tested video controller device 2 upon occurrence of a failure to match the recorded generated pixel transition counts with the prerecorded test pattern pixel transition counts for each video signal output of tested video controller device 2. The identification of failed video controller devices 2, 20 may be transmitted to computer terminal 3, via data links 1017, 317, and interface unit 17 to provide a visual display to an operator who is thereby informed which one of the tested video controller devices fail to conform to a standard video controller device.

In another embodiment of the invention, central processor unit 10 may transmit the generated pixel transition counts and the prerecorded test pattern pixel transition counts data recorded in memory 11 over data links 1017 and 317 via interface unit 17 to remote computer terminal 3. Computer terminal 3, upon receiving the transmitted pixel transition count data, compares the recorded generated pixel transition counts with the prerecorded test pattern pixel transition counts for each video signal output of tested video controller devices 2, 20. A performance failure of ones of the tested video controller devices 2, 20 is determined by computer terminal 3 detecting a failure to match the recorded generated pixel transition counts when compared with the prerecorded test pattern pixel transition counts. A failure of a tested video controller device 2, 20 occurs when a pixel transition count generated any one video signal output appearing on any one of the red, green or blue video output leads 2120, 2121, 2122 or on video output lead 2124 or horizontal sync lead, 2123, 2125 fails to match the test pattern pixel transition count prerecorded for the corresponding video signal output of a standard reference video controller device.

In yet another embodiment of the invention, apparatus 1 may be used to test a monochrome and a color video controller device having a ROM preprogrammed to control a monitor terminal to generate a pixel display configuration in accordance with data preprogrammed into the ROM. A count of pixel transitions generated by each video output lead of a standard reference video controller device is prerecorded in memory 11. A control signal is applied by apparatus 1 over one of data leads 102 to the video controller devices 2, 20 to enable the ROM of the selected video controller devices 2, 20 to generate pixel data representing the pixel display configuration on a single video output lead for monochrome video controller device 20 or on red, green, and blue video output leads 2120, 2121, 2122 of color video controller device 2. The generated pixel transitions are counted by counter 13 and compared with the prerecorded test display configuration pixel transition count to determine performance of the tested video controller device.

The method for testing video controller devices 2, 20 has the steps of prerecording counts of pixel transitions in a standard reference test pattern display intended for use in testing video controller devices 2, 20 and applying data representing the test pattern display to selected video controller devices 2, 20. A count of pixel transitions generated by the selected video controller devices 2, 20 in response to the applied data or control signal is compared with the prerecorded pixel transition counts, determined by switch 16, to determine performance of the selected video controller device 2, 20.

Figure 4:
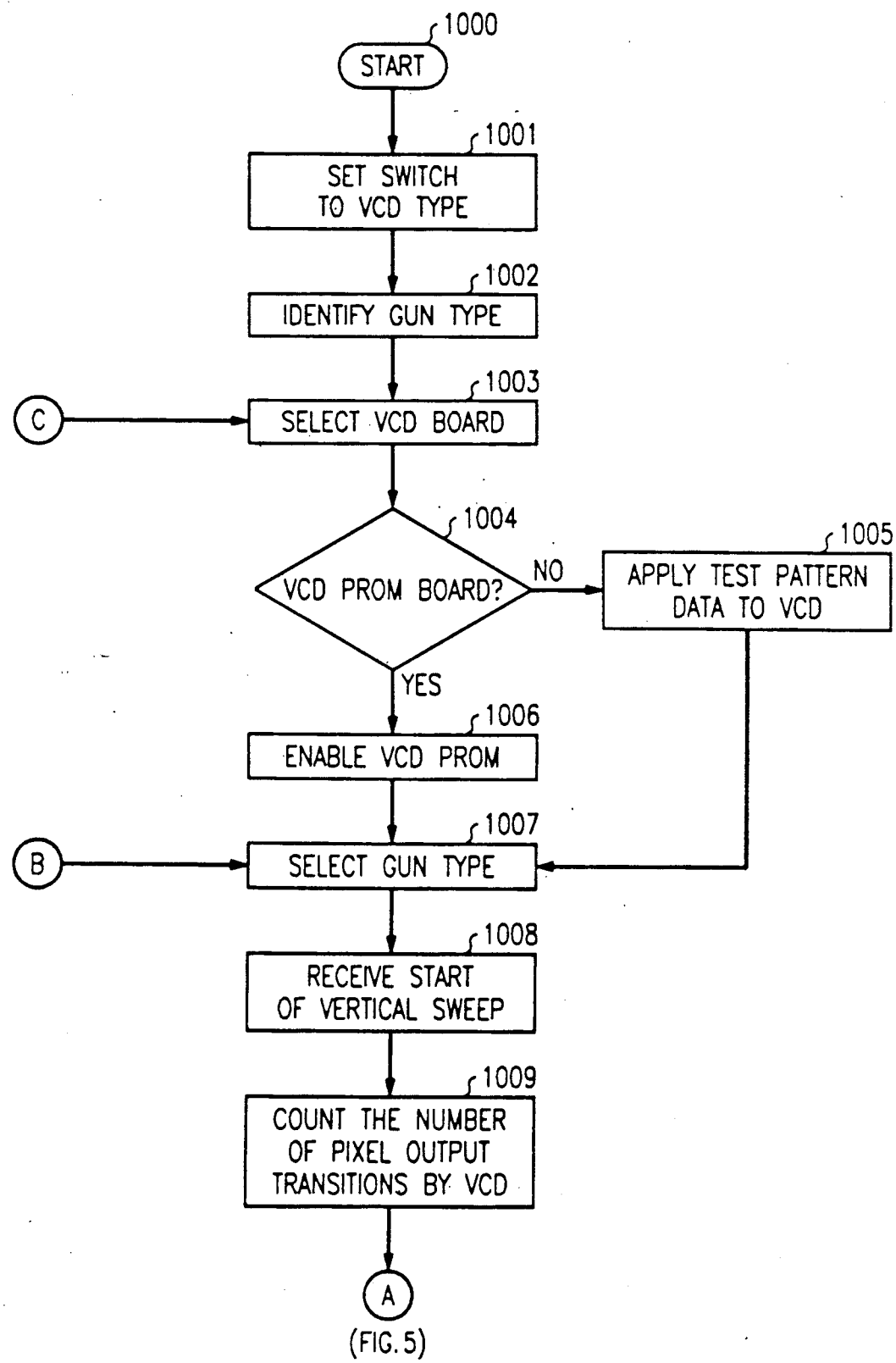
FIGS. 4 and 5 illustrates the steps of operating the video controller device testing apparatus set forth in FIG. 1 in accordance with the principles of the invention.

In initiating the sequence of testing video controller devices 2, 20, apparatus 1 sets switch 16, FIG. 4, steps 1000, 1001, to identify the type of video controller devices that are to be tested. The selected video controller device may be video controller device 20, FIG. 1, that has a single video signal output lead 2124 used to control operation of a monochrome monitor and which may have a ROM preprogrammed to generate data for a specific display configuration or which may receive the test pattern display configuration data from external circuitry. The selected video controller device may also be video controller device 2, FIG. 1, that has red, green, and blue video signal output leads 2120, 2121, and 2122 used to control operation of a color monitor and which may have a preprogrammed ROM or which may also receive test pattern display configuration data from external circuitry.

Central processor unit 10 identifies the type of monitor guns that the selected video controller device is intended to control from information entered into apparatus 1 or which is recorded in memory 11, FIG. 4, step 1002. A specific video controller device, step 1003, is selected from the video controller devices to be tested and identified if the selected video controller device is equipped with a preprogrammed ROM, step 1004. When it is determined that the selected video controller device has a preprogrammed ROM, central processor unit 10, FIG. 1, transmits an enabling signal over one of the data leads 102 to the selected video controller device 2, 20, FIG. 4, step 1006. Should it be determined that the selected video controller device requires input display configuration data, step 1004, central processor unit 10 transmits prerecorded test pattern display data over data leads 102 to the selected video controller device, step 1005.

If the selected video controller device, for example video controller device 20, is intended to control monochrome monitors, step 1007, central processor unit 10, FIG. 1, transmits a digital signal over bus 15 to set latch 14 to direct multiplex 12 to connect the horizontal sync lead 2125 and single video signal output lead 2124 of selected video controller device 20 to counter 13. When the selected video controller device is intended to control color monitors, such as video controller device 2, central processor unit 10 transmits a digital signal over bus 15 to set latch 14 to direct multiplex 12 to connect horizontal sync lead 2123 and red video signal output lead 2120 of video controller device 2 to counter 13. Central processor unit 10 transmits a start signal via lead 1013 to counter 13. Upon receipt of the start of the vertical sweep received on vertical sync lead 213, FIG. 4, step 1008, counter 13 counts the number of pixel transitions generated by the selected video controller device in response to the applied test pattern or ROM data, step 1009. Counter 13 indicates that it has recorded the pixel transition counts by returning a ready signal via lead 1310 to central processor unit 10.

The generated pixel transitions, FIG. 1, are transmitted over bus 15 to central processor unit 10 and compared with the prerecorded pixel transition count for the appropriate test pattern display recorded in memory 11. For selected monochrome video controller device 20, the pixel transition count generated by selected video controller device 20 is compared with a prerecorded pixel transition count for a test pattern display for a monochrome monitor. The pixel transition count generated by signals appearing on red video signal output lead 2120 of selected video controller device 2 is compared with a prerecorded red pixel transition count for a test pattern display of a color monitor. When the tested video controller device generated pixel transition count is compared and does not match the prerecorded pixel transition count, FIG. 5, steps 1010, 1011, the selected video controller device is identified as having a performance failure and is rejected, step 1012. Upon rejection, central processing unit 10 determines if all video controller devices have tested, step 1015, and if completed, ends the test sequence, step 1016. When it is determined that there are additional video controller devices to be tested, steps 1015, 1017, central processor unit 10 selects the next video controller device, step 1003, and repeats steps 1004 through 1011.

When the pixel transition count of the video signals generated by the tested video controller device match the prerecorded pixel transition count for the test pattern display, step 1011, central processor unit 10 then determines if all gun type pixel counts have been recorded, step 1013. If all of the gun controlling video signals have been recorded, central processor unit 10 asks if all of the video controller devices have been tested, step 1015, and if finished, ends the test sequence, step 1016. When it is determined that there are remaining video controlled devices to be tested, central processor unit 10 advances and selects the next video controller device, step 1017, 1003, and repeats steps 1004 through 1011.

Figure 5:
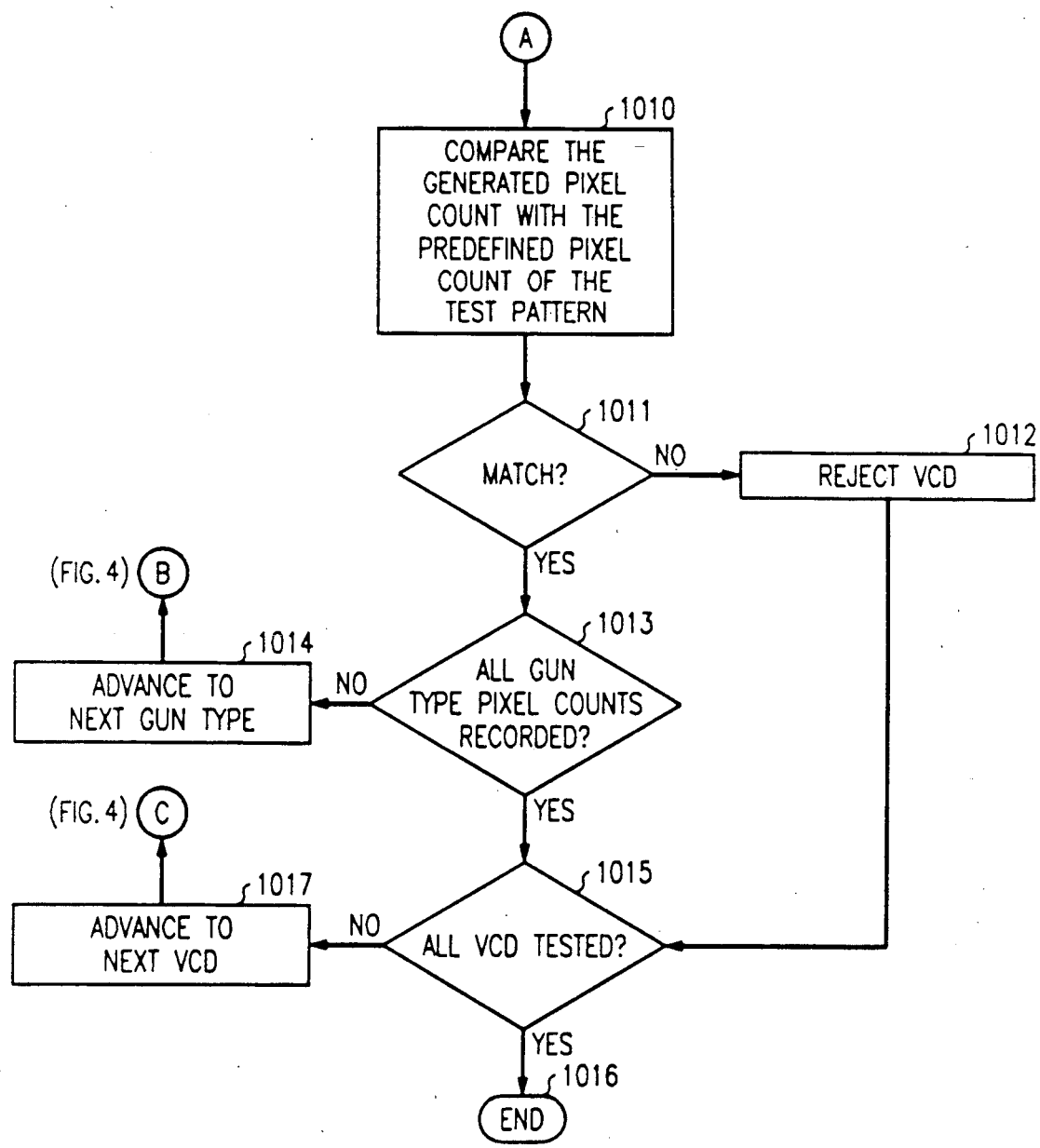

After the pixel transition count generated by signals appearing on red video signal output lead 2120 of selected video controller device 2, FIG. 1, is compared with and matches the prerecorded red pixel transition count for the color monitor test pattern display, FIG. 5, steps 1013, 1014, apparatus 1 selects the green video signal output lead 2121. Central processor unit 10 operating under control of instructions recorded in memory 11, FIG. 4, steps 1013, 1014, selects the green video signal lead of video controller device 2 and repeats steps 1007 through 1011.

The test sequence is continued for all of the video controller devices in the group. When a performance failure of a selected video controller device occurs by a failure to match a generated pixel transition count with a prerecorded test pattern pixel transition count for any gun controlling video signal output lead, the selected and tested video controller device is rejected. Apparatus 1 continues the test sequence until all of the group of video devices have been tested.

Figures 2, 3:
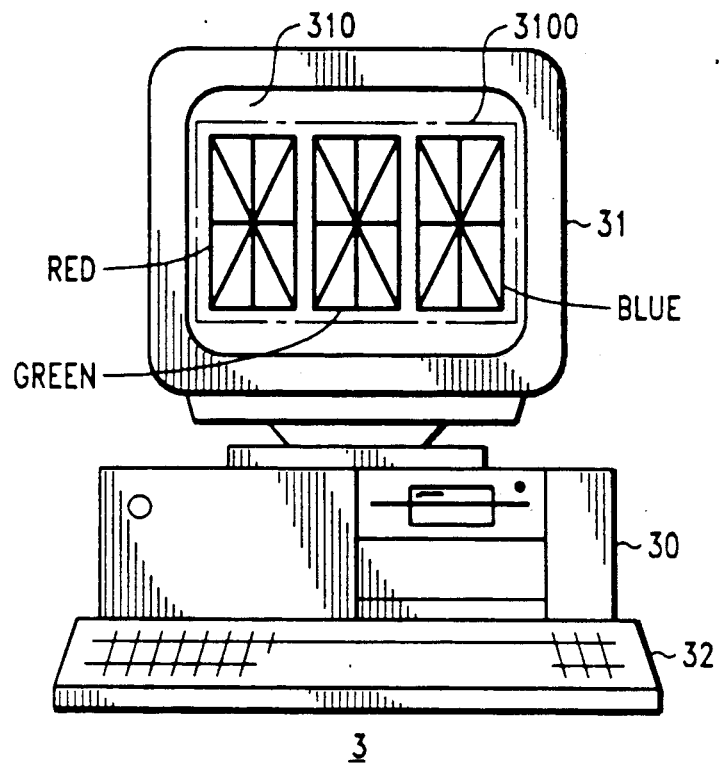
FIG. 2 illustrates representative test pattern arrays generated by a video controller device tested in accordance with an illustrative embodiment of the invention.
FIG. 3 illustrates a subroutine for determining performance of video controller devices tested in accordance with principles of the invention.

A typical test pattern display 3100, FIG. 2, for display on a CRT monitor 310 may be a geometrical configuration comprising three generally rectangular figures each having center vertical and horizontal lines with diagonal lines extending from each outer corner and intersecting the center vertical and horizontal lines. The predefined horizontal sync and pixel transition count for test pattern 3100 displayed on a monochrome CRT monitor may be assumed to be 450 and 99, respectively, FIG. 3. Apparatus 1, FIG. 1, applies data representing test pattern display 3100 to a monochrome video controller device and compares a count of pixel transitions generated by the tested video controller device in response to the applied test pattern data. When the generated horizontal sync count 450 and pixel transition count 99 matches the predefined horizontal sync 450 and pixel transition count 99, the tested monochrome video controller device is determined to have passed the performance test.

A test pattern 3100, FIG. 2, used in testing a color video controller device may consist of one red, green, and blue rectangular figure. Thus, the predefined horizontal sync and pixel transition count for each red, green, and blue rectangular configuration of test pattern 3100 displayed on a color CRT monitor 31 may be assumed to be 450 and 33, respectively, for each pixel transition count, FIG. 3. When the generated horizontal sync and pixel transition count of the horizontal sync and the red, green, and blue video signal output leads of the tested color video controller device matches the predefined horizontal sync and pixel transition count, then the tested color video controller device has passed the performance test. In an illustrious example set forth in FIG. 3, the generated horizontal sync 450 and the red and green pixel transition counts 33 match the predefined horizontal sync 450 and pixel transition counts 33. However, the generated blue pixel transition count of 30 does not match the predefined blue pixel transition 33 thereby indicating a performance of the tested color video controller device.

What is claimed is:

1. Apparatus for testing video controller devices used with a monitor terminal to generate display configurations on the terminal monitor comprising
    means for prerecording a count of pixel transitions within a test pattern display intended for use in testing the video controller devices, and
    means for applying data representing said test pattern display to a video controller device and comparing a count of pixel transitions generated by the video controller device in response to said applied test pattern data with said prerecorded test pattern pixel transition count to determine performance of the video controller device.

2. The video controller device testing apparatus set forth in claim 1 comprising
    means for simultaneously testing a plurality of the video controller devices.

3. The video controller device testing apparatus set forth in claim 2 wherein said simultaneously testing means comprises
    means for simultaneously applying said test pattern display to said plurality of video controller devices.

4. The video controller device testing apparatus set forth in claim 3 wherein said simultaneously testing means comprises
    means for selecting ones of said plurality of video controller devices and enabling a counter to record in memory a count of pixel transitions generated by video signal outputs of each selected video controller device.

5. The video controller device testing apparatus set forth in claim 4 wherein said simultaneously testing means comprises
    computing means for comparing said recorded generated pixel transition counts with said prerecorded test pattern pixel transition counts for each video signal output of said plurality of video controller devices and determining performance of each video controller device in response of said comparison.

6. The video controller device testing apparatus set forth in claim 4 wherein said simultaneously testing means comprises
    computing means for identifying a performance failure of ones of said tested video controller devices upon a failure to match said recorded generated pixel transition counts with said prerecorded test pattern pixel transition counts for each video signal output of said tested video controller devices.

7. The video controller device testing apparatus set forth in claim 4 wherein said computing means comprises
    means for transmitting said recorded generated pixel transition counts and said prerecorded test pattern pixel transition counts over a data link to a computer terminal.

8. The video controller device testing apparatus set forth in claim 7 wherein said computer terminal comprises
    means for receiving said transmitted pixel transition counts and comparing said recorded generated pixel transition counts with said prerecorded test pattern pixel transition counts of each video signal output of said plurality of video controller devices and for identifying a performance failure of ones of said tested video controller devices upon a failure to match said recorded generated pixel transition counts in comparison with said prerecorded test pattern pixel transition counts.

9. Apparatus for testing a video controller device having multiple video signal outputs used to control a monitor terminal to generate a color display configuration on the terminal monitor comprising
    means for prerecording a count of each pixel transition generated by the video signal outputs in displaying a color test pattern intended for use in testing the video controller device, and
    means for applying data representing said color test pattern display to a video controller device and comparing a count of pixel transitions generated by each video signal output of the video controller device in response to said color test pattern data and comparing a pixel transition count generated by each video signal output with said prerecorded test pattern pixel transition count for each video signal output to determine performance of the video controller device.

10. The video controller device testing apparatus set forth in claim 9 wherein said apparatus further comprises means for identifying a performance failure of said tested video controller device upon a failure to match a pixel transition count generated any one video signal output with said prerecorded test pixel transition for the corresponding video signal output.

11. Apparatus for testing a video controller device having a programmed ROM for enabling the video controller device to control a monitor terminal to generate a pixel display configuration on the terminal monitor in accordance with data programmed into the ROM comprising means for prerecording a count of pixel transitions generated by each video signal output of the video controller device when enabling the terminal monitor to display the pixel display configuration, and means for applying a control signal to the video controller device to enable the ROM thereof to generate pixel data representing the pixel display configuration at video signal outputs of the video controller device and comparing a count of pixel transitions generated by each video signal output of the video controller device in response to the generated pixel data with said prerecorded pixel display configuration pixel transition count to determine performance of the video controller device.

12. Apparatus for testing video controller devices each having multiple video signal outputs used to control a monitor terminal to generate a color display configuration on the terminal monitor comprising means for prerecording a count of each pixel transition generated by the video signal outputs in displaying a color test pattern intended for use in testing the video controller devices, means for simultaneously applying data representing said color test pattern display to a plurality of the video controller devices, means for selecting ones of said plurality of video controller devices and enabling a counter to record in memory a count of pixel transitions generated by video signal outputs of each selected video controller device in response to said applied color test pattern data, means for comparing said recorded generated pixel transition counts with said prerecorded color test pattern pixel transition counts for each video signal output of said selected video controller devices, and means for identifying a performance failure of ones of said selected video controller devices upon a failure to match said recorded generated pixel transition counts with said prerecorded test pattern pixel transition counts for and video signal output of said selected video controller devices.

13. Apparatus for testing video controller devices each having multiple video signal outputs used to control a monitor terminal to generate a color display configuration on the terminal monitor comprising means for prerecording a count of each pixel transition generated by the video signal outputs in displaying a color test pattern intended for use in testing the video controller devices, means for simultaneously applying data representing said color test pattern display to a plurality of the video controller devices, means for selecting ones of said plurality of video controller devices and enabling a counter to record in memory a count of pixel transitions generated by video signal outputs of each selected video controller device in response to said applied color test pattern data, means for transmitting said recorded generated pixel transition counts for said selected video controller devices and said prerecorded color color test pattern pixel transition counts over a data link to a computer terminal coupled by said data link with the video controller device testing apparatus, and means at said computer terminal for receiving said transmitted pixel transition counts and comparing said recorded generated pixel transition counts with said prerecorded test pattern pixel transition counts of each video signal output of said selected video controller devices and for identifying a performance failure of ones of said tested video controller devices upon a failure to match said recorded generated pixel transition counts with said prerecorded test pattern pixel transition counts.

14. A method for testing a video controller device used with a monitor terminal to generate display configurations on the terminal monitor comprising the steps of prerecording a count of pixel transitions in a test pattern display intended for use in testing the video controller device, and applying data representing said test pattern display to the video controller device and comparing a count of pixel transitions generated by the video controller device in response to said applied data with said prerecorded pixel transition count to determine performance of the video controller device.

15. A method for testing a video controller device having multiple video signal outputs used to control a monitor terminal to generate a color display configuration on the terminal monitor comprising the steps of prerecording a count of each pixel transition generated by the video signal outputs of the video controller device to generate a color test pattern display intended for use in testing the video controller device, applying data representing said color test pattern display to the video controller device, comparing a count of pixel transitions generated by each video signal output of the video controller device in response to said applied color test pattern data with said prerecorded test pattern pixel transition count for each video signal output, and identifying a performance failure of the video controller device upon a failure to match said generated pixel transition count generated any one video signal output with said prerecorded color test pattern pixel transition count for the video signal output.

16. A method for testing a video controller device having a programmed ROM for enabling the video controller device to control a monitor terminal to generate a pixel display configuration on the terminal monitor in accordance with data programmed into the ROM comprising the steps of prerecording a count of pixel transitions generated by each video signal output of the video controller device when enabling the terminal monitor to display the pixel display configuration, and applying a control signal to the video controller device to enable the ROM thereof to generate pixel data representing the pixel display configuration at video signal outputs of the video controller device and comparing a count of pixel transitions generated by each video signal output of the video controller device in response to the generated pixel data and comparing a pixel transition count generated by each video signal output with said prerecorded pixel display configuration transition count to determine performance of the video controller device.

17. A method for testing video controller devices each having a horizontal sync output and video signal multiple outputs used to control a monitor terminal to generate a color display configuration on the terminal monitor comprising the steps of prerecording a count of each horizontal sync signal and of each pixel transition generated by the horizontal sync and video signal outputs of a reference video controller device to generate a color test pattern display intended for use in testing the video controller devices, simultaneously applying data representing said color test pattern display to a plurality of the video controller devices, selecting ones of said plurality of video controller devices and enabling a counter to record in memory a count of horizontal sync signals and pixel transitions generated by horizontal sync and video signal outputs of each selected video controller device in response to said applied color test pattern data, comparing said generated horizontal sync and pixel transition counts with said prerecorded color test pattern horizontal sync and pixel transition count for each horizontal sync and video signal output of said selected video controller devices, and identifying a performance failure of said selected video controller devices upon a failure to match said compared generated horizontal sync and pixel transition counts with said prerecorded test pattern horizontal sync and pixel transition counts for any horizontal sync and vide signal output of said selected video controller devices.

* * * * *